UNITED STATES PATENT OFFICE.

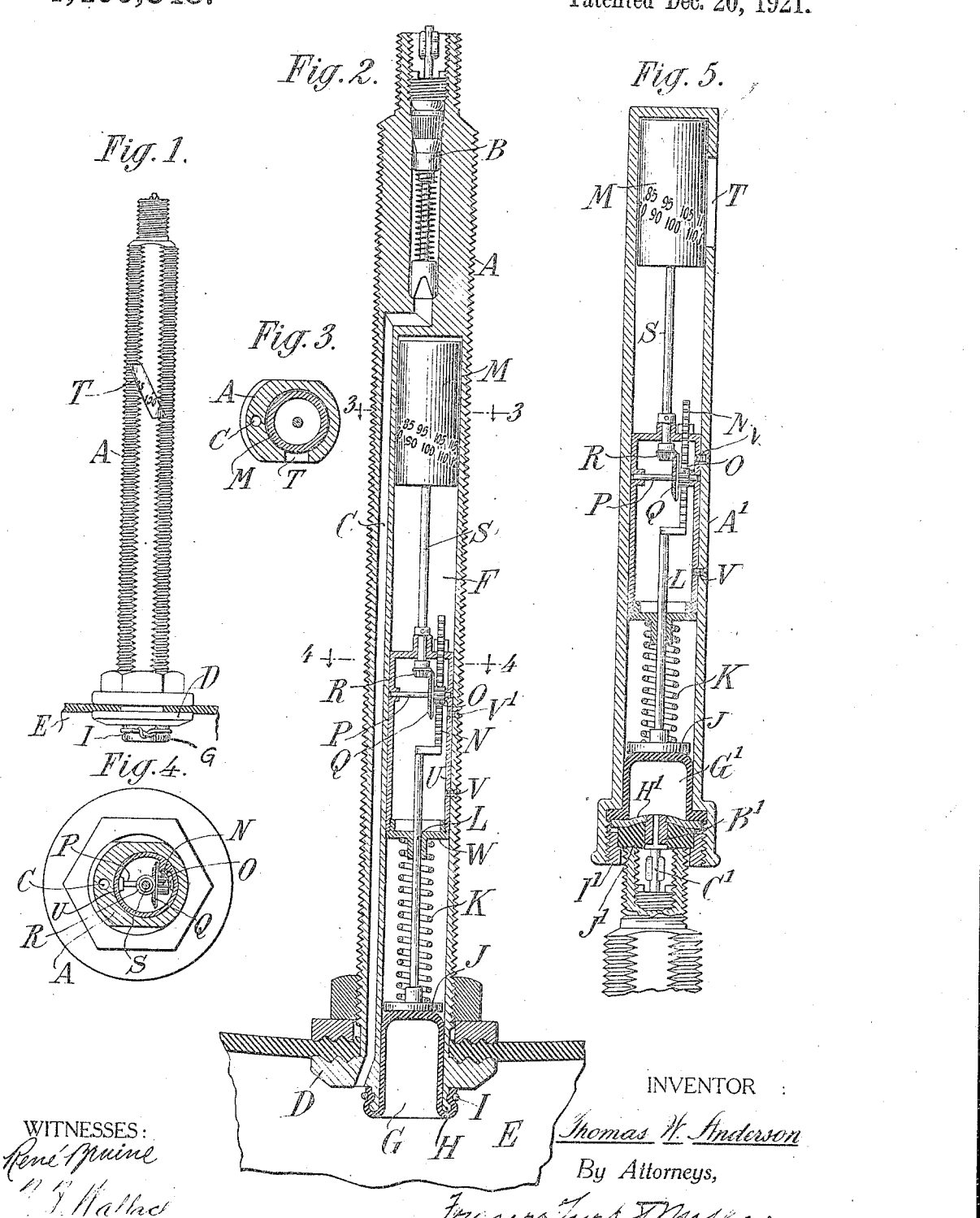

THOMAS W. ANDERSON, OF CAMDEN POINT, MISSOURI, ASSIGNOR TO A. SCHRADER'S SON, INCORPORATED, OF BROOKLYN, NEW YORK, A CORPORATION OF NEW YORK.

PRESSURE-GAGE.

1,400,848.

Specification of Letters Patent.   Patented Dec. 20, 1921.

Application filed June 14, 1915.   Serial No. 33,867.

*To all whom it may concern:*

Be it known that I, THOMAS W. ANDERSON, a citizen of the United States of America, residing in Camden Point, in the county of Platte and State of Missouri, have invented certain new and useful Improvements in Pressure-Gages, of which the following is a specification.

This invention relates to pressure gages, and aims to provide certain improvements therein.

The construction is adapted to be used in connection with a tire valve, or separately therefrom, as may be desired.

Referring to the drawings which illustrate several embodiments of the invention,—

Figure 1 is a side elevation of a combined gage and valve.

Fig. 2 is an enlarged diametrical section thereof.

Fig. 3 is a cross-section on the line 3—3 in Fig. 2.

Fig. 4 is a cross-section on the line 4—4 in Fig. 2.

Fig. 5 is a diametrical section of the device employed as a gage and adapted for application to a tire valve.

Referring first to Figs. 1 to 4, let A indicate a suitable shell which in these figures is illustrated as a tire valve shell or casing. At the top of the shell is provided an inlet or check valve B of well-known construction, and which, therefore, need not be particularly described. The shell is formed with a passage C which passes through the flanged foot of the valve shell whereby to establish communication with the tube E. The passage for the inlet and outlet of air is by this means isolated from the gage structure.

The gage structure is contained principally in an enlarged bore F formed in the shell or casing. At the foot of the shell and arranged partly within the bore is preferably provided a thimble or diaphragm G which is preferably made of elastic rubber and is fastened to the shell around the flange nipple H formed at the foot of the latter, the diaphragm being clamped to the flange nipple by a ring I or in any other suitable manner. Any other suitable pressure responsive means may be employed. Above the top of the diaphragm is arranged a plate J which is pressed downwardly by a spring K surrounding a rod L which is connected with the plate J. As the pressure increases the diaphragm expands, pushing up the plate J and rod L.

In the present construction this reciprocatory movement of the plate J is translated into a rotary movement of the indicator, lettered M, which is shown as arranged at the top of the bore F. In the construction shown the rod L has fixed to it a rack N which meshes with a pinion O carried upon a shaft P, which shaft also carries a beveled gear Q meshing with a smaller bevel R fixed at the lower end of the rod S which carries the indicator M.

The effect of this construction is that as the pressure increases the indicator member M is turned to expose the indications (shown in pounds) through a slot or window T formed in the casing. In order to avoid overlapping of the indications the window T is preferably more or less vertically arranged, being shown as slightly inclined to the vertical.

The gear device is preferably located within a casing U, the upper part of which has a bearing for the shaft S, and the lower part a bearing for the rod L. Between the two the shaft P is mounted. The casing U may be fixed within the bore F by pins V V'. For purposes of convenience the lower wall of the casing U is formed as a head W which screws into the body of the casing. Upon removal of the pins V V' and the ring I, the entire device may be slid out of the casing.

One of the advantages of the invention is that the gearing may be so proportioned as to produce relatively large movements of the indicator M upon relatively smaller movements of the plate J. In the construction shown the movements of the plate are greatly amplified so that a large surface of the indicator may be employed for indicating purposes. The parts may be so proportioned that several rotations may be given to the indicator if desired during a complete movement of the plate J from zero to the maximum pressure which the gage is adapted to indicate.

In Fig. 5 I have illustrated the construction as applied to a gage *per se*. In this construction the valve is omitted, and the parts are contained within a casing A'. The foot of the casing is provided with an abutment B' which is adapted to contact with the stem C' of a tire valve. The diaphragm or thimble G' is in this case formed with a flange which is clamped against a shoulder on the casing by a plate H' held in place by a threaded sleeve I'. A packing J' is provided for making a tight joint with the top of the valve.

While I have shown and described certain embodiments of the invention, it will be understood that I do not wish to be limited thereto, since various changes can be made therein without departing from the invention.

What I claim is:—

1. In a pressure gage, the combination of a rotary cylindrical drum-like indicating member, a longitudinally reciprocating pressure-responsive member, said indicating member having its axis of movement in the line of movement of said pressure responsive member, a connection between the two for translating the movements of the reciprocating member into rotary movements of the indicating member, and a cylindrical casing in which said parts are located in alinement one beyond another, said casing having a substantially straight bore of even diameter throughout.

2. In a pressure gage, the combination of a longitudinally reciprocable pressure-responsive member, a rack moved by said member, a pinion meshing with said rack, a pair of beveled gears moved by said pinion, and a rotary cylindrical indicating member moved by one of said beveled gears.

3. In a device of the character described, a shell having a tire-engaging flange, and a flange nipple at its foot, said flange nipple being other than said tire-engaging flange, an elastic member having a part surrounding said flange nipple and clamped thereto, and gage mechanism operated by the movements of said elastic member.

4. In a pressure gage, the combination of a tubular casing, pressure-responsive means, indicating means actuated thereby, said two means being adapted to function in said casing, a transmission mechanism between said pressure-responsive means and said indicating means, and a support for said transmitting means, comprising a tubular sleeve adapted to be inserted in said tubular casing.

In witness whereof, I have hereunto signed my name in the presence of two subscribing witnesses.

THOMAS W. ANDERSON.

Witnesses:
W. P. WOODSON,
A. L. PERRIN.